United States Patent
Belmonte et al.

(10) Patent No.: US 9,518,472 B2
(45) Date of Patent: Dec. 13, 2016

(54) TURBINE ENGINE STATOR WHEEL AND A TURBINE OR A COMPRESSOR INCLUDING SUCH A STATOR WHEEL

(75) Inventors: Olivier Belmonte, Perthes en Gatinais (FR); Antoine Jean-Philippe Beaujard, Melun (FR)

(73) Assignees: SNECMA, Paris (FR); HERAKLES, Le Haillan (FR)

( * ) Notice: Subject to any disclaimer, the term of this patent is extended or adjusted under 35 U.S.C. 154(b) by 436 days.

(21) Appl. No.: 14/234,268

(22) PCT Filed: Jul. 18, 2012

(86) PCT No.: PCT/FR2012/051698
§ 371 (c)(1),
(2), (4) Date: Jan. 22, 2014

(87) PCT Pub. No.: WO2013/014367
PCT Pub. Date: Jan. 31, 2013

(65) Prior Publication Data
US 2014/0147264 A1 May 29, 2014

(30) Foreign Application Priority Data
Jul. 22, 2011 (FR) ...................... 11 56710

(51) Int. Cl.
*F01D 9/04* (2006.01)
*F01D 25/24* (2006.01)

(52) U.S. Cl.
CPC ................ *F01D 9/04* (2013.01); *F01D 9/042* (2013.01); *F01D 25/246* (2013.01); *F05D 2300/21* (2013.01); *F05D 2300/222* (2013.01); *F05D 2300/603* (2013.01); *F05D 2300/6033* (2013.01)

(58) Field of Classification Search
CPC .......... F01D 9/04; F01D 9/042; F01D 25/246; F05D 2300/222; F05D 2300/6033; F05D 2300/603; F05D 2300/21
USPC ........................ 415/135–138, 189, 190, 200, 208.2,415/209.2, 209.3, 209.4
See application file for complete search history.

(56) References Cited

U.S. PATENT DOCUMENTS

| 2,968,468 | A | * | 1/1961 | Welsh | ...................... F01D 9/044 |
| | | | | | 415/137 |
| 4,050,843 | A | * | 9/1977 | Needham | ................ F01D 11/18 |
| | | | | | 415/116 |
| 5,201,846 | A | * | 4/1993 | Sweeney | .................. F01D 9/04 |
| | | | | | 415/170.1 |

(Continued)

FOREIGN PATENT DOCUMENTS

EP            1 013 885            6/2000

OTHER PUBLICATIONS

International Search Report Issued Oct. 18, 2012 in PCT/FR12/051698 filed Jul. 18, 2012.

*Primary Examiner* — Hoang Nguyen
(74) *Attorney, Agent, or Firm* — Oblon, McClelland, Maier & Neustadt, L.L.P.

(57) ABSTRACT

A turbine nozzle comprises a plurality of composite material vanes, each vane comprising an inner platform, an outer platform with attachment tabs on the outside, and at least one airfoil extending between the inner and outer platforms and secured thereto. The attachment tabs of the vanes are engaged on a metal assembly ring supporting all of the vanes, extending continuously along the outer platforms of adjacent vanes, and forming a distinct assembly part between the vanes and a turbine casing.

16 Claims, 5 Drawing Sheets

(56) References Cited

U.S. PATENT DOCUMENTS

| | | | |
|---|---|---|---|
| 5,226,789 A * | 7/1993 | Donges | F01D 9/042 415/173.4 |
| 6,164,903 A | 12/2000 | Kouris | |
| 7,540,707 B2 * | 6/2009 | Dervaux | F01D 5/08 415/115 |
| 2010/0068034 A1 | 3/2010 | Schiavo et al. | |
| 2010/0183435 A1 | 7/2010 | Campbell et al. | |
| 2011/0008156 A1 | 1/2011 | Prentice et al. | |

* cited by examiner

TURBINE ENGINE STATOR WHEEL AND A TURBINE OR A COMPRESSOR INCLUDING SUCH A STATOR WHEEL

BACKGROUND OF THE INVENTION

The invention relates to a stator wheel for a turbine engine, in particular an aviation gas turbine engine on an industrial turbine, where such a stator wheel forms a turbine nozzle or a compressor diffuser.

Improving the performance of turbine engines and reducing their polluting emissions leads to ever-higher operating temperatures being envisaged.

For the elements in the hot portions of turbine engines, proposals have thus been made to use ceramic matrix composite (CMC) materials. Such materials present remarkable thermostructural properties, i.e. mechanical properties that make them suitable for constituting structural elements combined with the ability to conserve these mechanical properties at high temperatures.

Furthermore, CMC materials are of much lower density than the metal materials conventionally used for making the elements in the hot portions of turbine engines.

Thus, documents WO 2010/061140, WO 2010/116066, and WO 2011/080443 describe making turbine engine blades with integral inner and outer platforms. The use of CMC material specifically for turbine nozzles has also been proposed, in particular in document WO 2010/146288.

Traditional metal turbine nozzles are usually built by assembling together a limited number of sectors obtained by casting, each sector having quite a large number of vanes. The complex shape of such sectors makes them difficult to obtain as a single piece of CMC material. In order to obtain a turbine nozzle made of CMC material, it has therefore been necessary to envisage assembling together a relatively large number of individual elements, or vanes, each vane having only a small number of airfoils, and possibly only one airfoil. This leads to a problem of making an assembly of nozzle vanes simply and economically while achieving satisfactory sealing, in particular for the purpose of avoiding leaks between the gas flow passage through the turbine and the outside of the nozzle.

A similar problem arises with making turbine engine compressor diffusers, either using CMC materials in the downstream compressor stages that are exposed to higher temperatures, or else using organic matrix composite (OMC) materials, at least in the upstream compressor stages.

OBJECT AND SUMMARY OF THE INVENTION

An object of the invention is to provide a solution to this problem, and for this purpose the invention proposes a turbine engine stator wheel comprising a plurality of vanes made of composite material, each vane comprising an inner platform, an outer platform presenting attachment tabs on the outside, and at least one airfoil extending between the inner and outer platforms and secured thereto, the vane and the outer platform together with the attachment tab forming a single piece of composite material, the stator wheel comprising a metal assembly ring in which the attachment tabs of the vanes are engaged, the metal ring supporting all of the vanes, extending continuously along the outer platforms of a plurality of adjacent vanes, and forming a distinct assembly part between the vanes and a casing.

The metal assembly ring thus serves both to integrate the vanes of the stator wheel and also to provide sealing by extending along the outer platforms of the vanes.

Preferably, the metal ring is made of sheet metal and can thus present capacity for deformation suitable for compensating for differential dimensional variations of thermal origin.

Advantageously, the metal ring presents frustoconical bearing surfaces contributing to holding the vanes radially and axially while also making it possible to accommodate differential dimensional variations more easily.

In an embodiment, the metal ring has a section that is substantially Ω-shaped and outwardly open, having a web portion and flanges terminating in end portions forming hooks for attaching to a casing, and frustoconical bearing surfaces in contact with the attachment tabs of the vanes are situated on the outside faces of the flanges of the ring.

Advantageously, the outer platform of each vane presents a rib projecting outwards and coming into radial abutment against a surface portion of the metal ring, thus contributing to opposing tilting of the vane. The rib also performs a stiffener function. It may extend the airfoil of the vane when the vane has only one airfoil.

Preferably, the metal ring comprises a single piece and presents a vane insertion window. Under such circumstances, the stator wheel may further include at least one latch for blocking in position a vane mounted at the level of the insertion window.

In order to further improve sealing, sealing wafers may be arranged on the outer faces of the outer platforms of the vanes, each wafer covering at least part of a junction between the outer platforms of two adjacent vanes.

The invention also provides a turbine or a compressor for a turbine engine and including at least one stator wheel as defined above.

Advantageously, when the turbine engine further comprises a rotor wheel adjacent to the stator wheel and comprising blades provided at their ends with wipers facing an abradable material supported by a ring, an additional metal ring is mounted between the abradable support ring and the outer platforms of the vanes of the stator wheel, bearing thereagainst.

This additional metal ring contributes to improving sealing. It may be made of sheet metal. The additional metal ring is preferably a single piece.

BRIEF DESCRIPTION OF THE DRAWINGS

The invention can be better understood on reading the following description given by way of non-limiting indication and with reference to the accompanying drawings, in which.

DETAILED DESCRIPTION OF EMBODIMENTS

Figure 1:
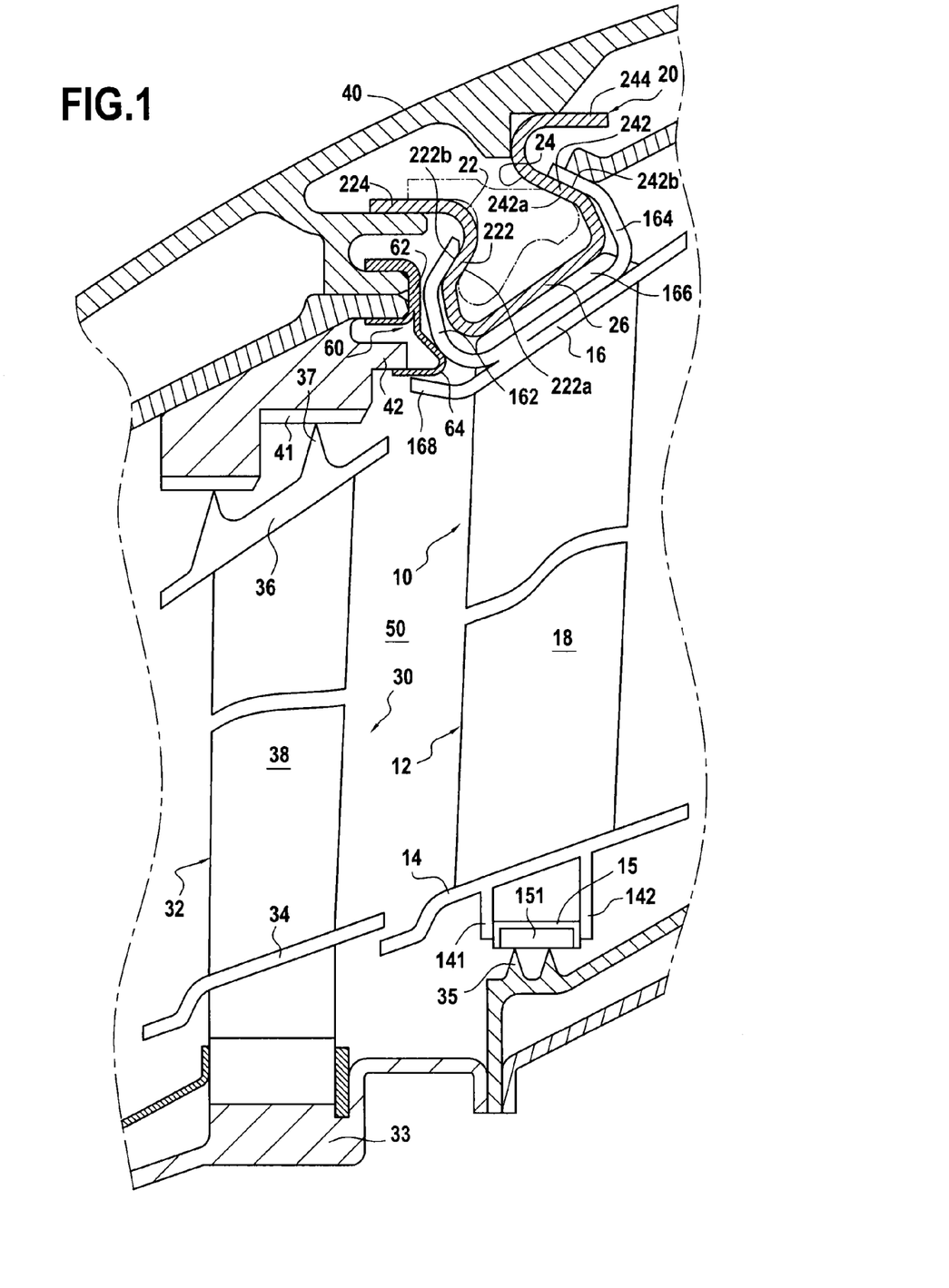
FIG. 1 is a fragmentary section view of a low pressure turbine of a turbine engine incorporating a nozzle in an embodiment of the invention.

A multistage low pressure turbine of a turbine engine as shown in part in FIG. 1 comprises a plurality of stator wheels forming nozzles 10 that alternate with rotors 30 and that are mounted in a turbine casing 40.

Each rotor 30 comprises a plurality of blades 32 each having an inner platform 34, an outer platform 36, and an airfoil 38 extending between the platforms 34 and 36. Under the platform 34, the blade is extended by a root that is engaged in a housing in a disk 33. On the outside, the outer platform 36 supports wipers 37 facing an abradable material 41 carried by a sectorized ring 42.

The blades 32 may be conventional metal blades or they may be blades made of CMC material, e.g. obtained as described in the above-mentioned documents WO 2010/061140, WO 2010/116066, or FR 2 953 885.

In accordance with the invention, at least one of the nozzles, e.g. the nozzle 10 in FIG. 1, is made up of a plurality of nozzle vanes 12 of CMC material that are assembled together with the help of an assembly ring 20.

In the example shown (FIGS. 1 and 2), each vane 12 is a single-airfoil vane with an inner platform 14, an outer platform 16, and one airfoil 18 extending between the platforms 14 and 16 and secured thereto.

Figure 2:
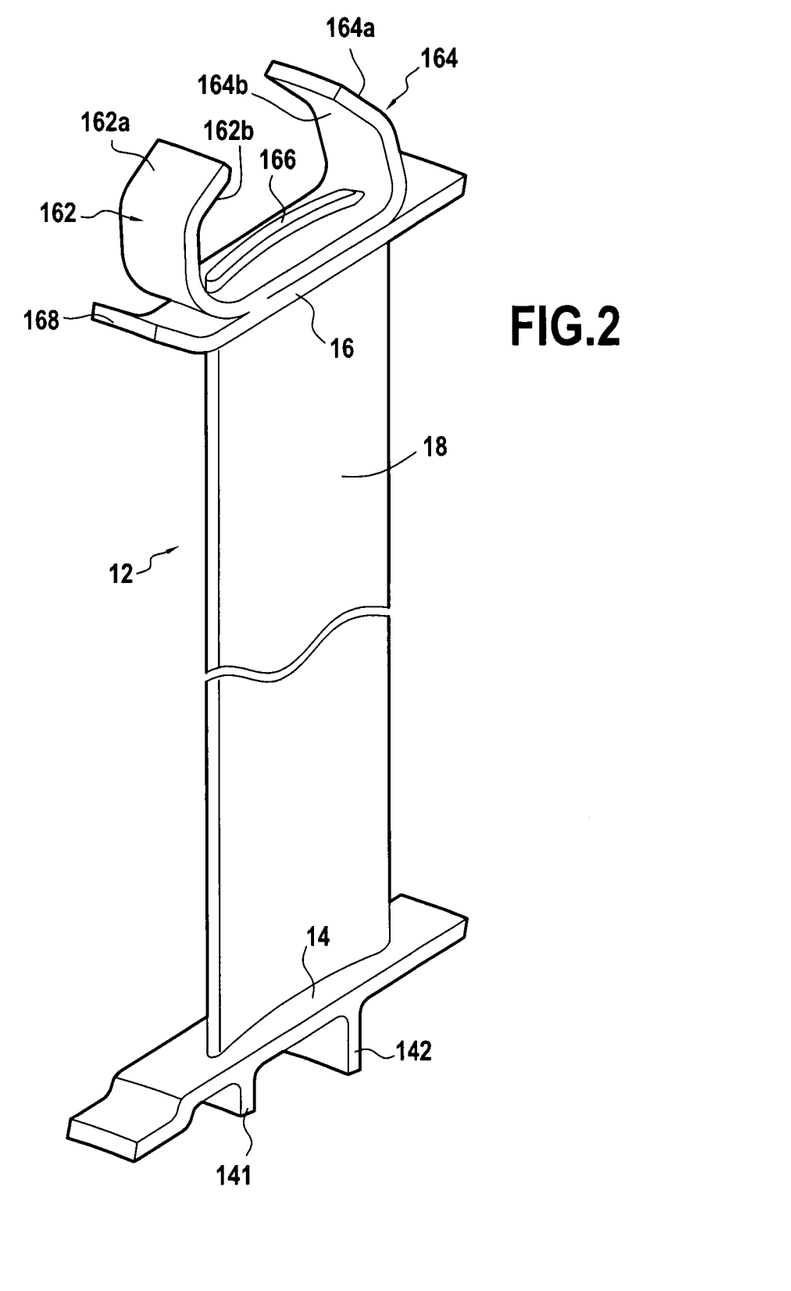
FIG. 2 is a perspective view of a vane of the FIG. 1 turbine nozzle.

The outer faces of the platforms 14, 34 and the inner faces of the platforms 16, 36 define the gas-flow passage 50 through the turbine.

On their inner faces, the inner platforms 14 of the vanes 12 present ribs 141, 142 for mounting a ring 15 supporting abradable material 151 facing wipers 35 carried by the disk 33. The ring of abradable material may, for example, be constituted by a strip of honeycomb material that is rolled up and positioned between the ribs 141 and 142.

The wipers 35 co-operate with the abradable material 151 to provide sealing on the inside, while the wipers 37 co-operate with the abradable material 41 to provide sealing at the tips of the blades 32.

On the outside, each outer platform 16 of a vane 12 presents attachment tabs 162, 164 that project outwards respectively on the upstream and downstream sides. The terms "upstream" and "downstream" are used in the present description relative to the flow direction of gas along the passage 50. The upstream attachment tab 162 has an end portion 162a that is folded downstream so as to present a frustoconical internal bearing surface portion 162b. The downstream attachment tab 164 has an end portion 164a that is folded upstream so as to present a frustoconical internal bearing surface 164b.

Also on the outside, each outer platform 16 of a vane 12 presents a rib 166 that extends in the longitudinal (axial) direction of the platform 16 and that constitutes a stiffener for the platform. The rib 166 may be formed by an extension of the airfoil 18.

Each vane 12 is made as a single piece of CMC material. For this purpose, it is possible to use a method as described in document WO 2010/146288 or in document WO 2011/080443, the content of those documents being incorporated herein by way of reference. Briefly, a fiber blank is made by multilayer or three-dimensional weaving using yarns made of ceramic fibers, e.g. silicon carbide (SiC) fibers or carbon fibers. The fiber blank is shaped so as to obtain a fiber preform having a shape close to that of the vane to be made. The preform is consolidated in its shape, e.g. by being impregnated with a carbon or ceramic precursor resin, followed by curing and then pyrolyzing the resin, with the preform being held in tooling. The consolidated preform as extracted from the tooling is densified by a ceramic matrix, e.g. by chemical vapor infiltration (CVI). By way of example, the matrix may be made of SiC or it may be a self-healing matrix having matrix phases made of boron carbide $B_4C$ or of a tertiary Si—B—C system. The preparation of such self-healing matrices is described in particular in documents U.S. Pat. No. 5,246,756 and U.S. Pat. No. 5,965,266.

Figure 3:
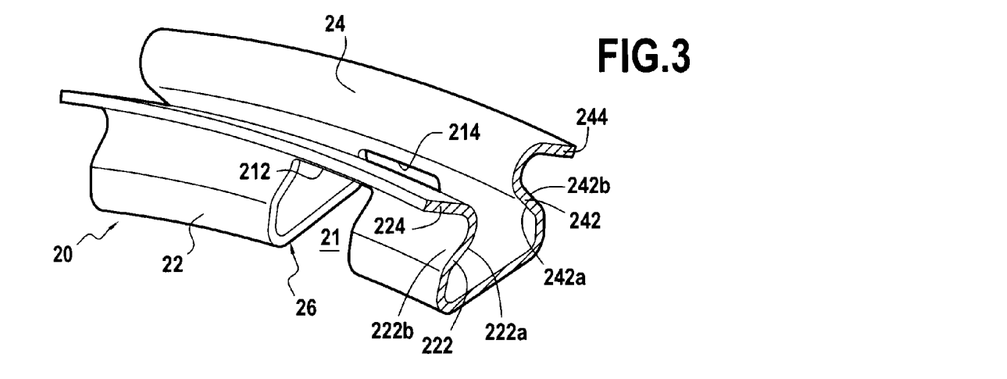
FIG. 3 is a fragmentary perspective view of a metal assembly ring of the FIG. 1 nozzle.

The vanes 12 are assembled to form the axisymmetric turbine nozzle 10 with the help of an annular assembly ring 20 (FIGS. 1, 3). The ring 20 is advantageously made of metal sheet. The material constituting the ring 20 is a metal suitable for withstanding the temperatures that are encountered in service, e.g. a metal or metal alloy as commonly used in low pressure (LP) turbine enclosures such as an alloy based mainly on nickel and chromium and known under the name Inconel® or Waspaloy®.

In the example shown, the ring 20 has a cross-section that is Ω-shaped and open towards the outside. It comprises a web portion 26 extended upstream and downstream by respective upstream and downstream flanges 22, 24 that are of substantially S-shaped section. On their inner faces, the flanges 22 and 24 present surface portions in their respective middle portions 222, 242, which surface portions form frustoconical bearing surfaces 222a, 242a. On their outer faces, the flanges 22, 24 also present frustoconical surface portions in their respective middle portions 222, 242 that form bearing surfaces 222b, 242b. The flanges 22, 24 are terminated by end portions that are folded respectively upstream and downstream to form upstream and downstream hooks given respective references 224, 244 for the purpose of assembly in the turbine casing 40.

The ring 20 is preferably in the form of a single-piece annulus and it presents an opening or window 21 through which the attachment tabs 162, 164 of the vanes 12 can be inserted. The width of the window 21 is thus equal to or slightly greater than the dimension of the attachment tabs 162, 164 in the circumferential direction. In the example shown, the window 21 is formed by a gap extending between a first end 212 situated substantially at the connection between the middle portion 222 and the hook 224, and a second end 214 situated substantially at the connection between the web 26 and the middle portion 242. The way the vanes 12 are assembled together by the ring 20 is described below with reference to FIGS. 4 to 11.

A first step consists in inserting locking means in the ring 20 for use, after the last vane 12 has been put into place in the insertion window 21, to hold that vane in position.

Figures 4, 5, 6:
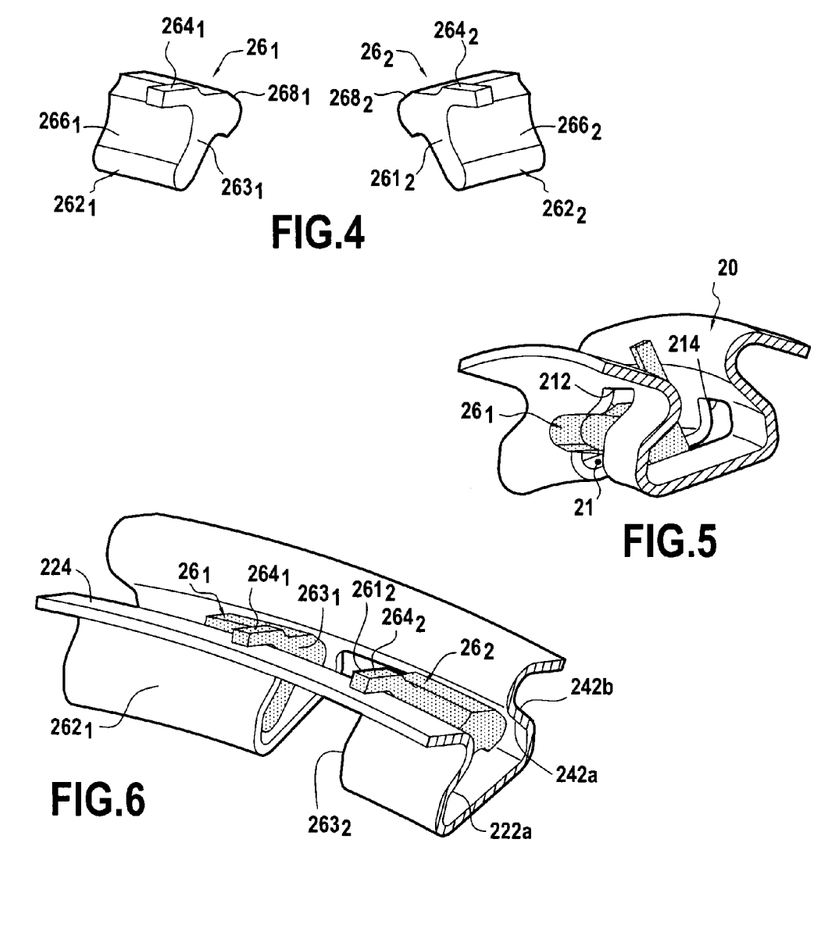
FIG. 4 is a perspective view of a latch used for assembling the FIG. 1 nozzle.
FIGS. 5 to 11 are fragmentary views in section and/or in perspective showing successive steps in assembling the FIG. 1 turbine nozzle.
Figure 7:
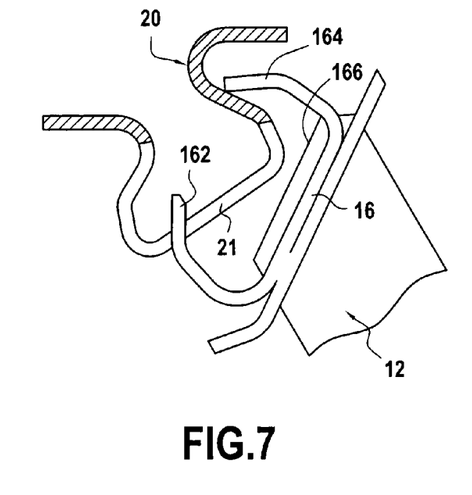
Figure 8:
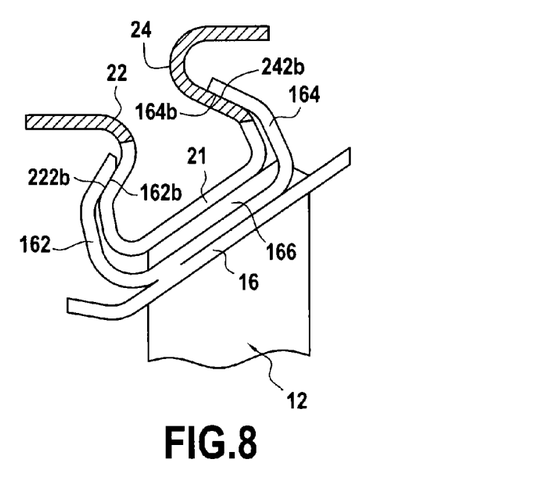

In the example shown, the locking means comprise two latches $26_1$, $26_2$ as shown in FIG. 4. The latches $26_1$, $26_2$ are made of a metal material that is similar and preferably identical to the material of the ring 20.

The latches $26_1$, $26_2$ present respective similar latch bodies $262_1$, $262_2$ in the form of annular sectors. In the vicinity of one of its circumferential ends $263_1$, the latch body $262_1$ is extended at its tip by a locking lug $264_1$. In similar manner, in the vicinity of one of its circumferential ends $261_2$, the latch body $262_2$ is extended at its tip by a locking lug $264_2$. On its opposite circumferential faces, the latch body $262_1$ presents surface portions forming frustoconical bearing surfaces $266_1$, $268_1$. Likewise, on its opposite circumferential faces, the latch body $262_2$ presents surface portions forming frustoconical bearing surfaces $266_2$, $268_2$.

The latch bodies $262_1$, $262_2$ are of dimensions and profiles that are suitable for being engaged in the ring 20 by passing through the window 21 in order to be inserted in the portion of the ring 20 that is situated between the web 26 and the middle portions of the flanges 22, 24, and so as to be capable of taking up a position in which the frustoconical bearing surfaces $266_1$ and $266_2$ are in contact with the frustoconical bearing surface 222*a*, the frustoconical bearing surfaces $268_1$ and $268_2$ are in contact with the frustoconical bearing surface 242*a*, and the locking lugs $264_1$, $264_2$ bear against the outer face of the upstream hook 224. FIG. 5 shows the latch $26_1$ engaged in the window 21 of the ring 20. FIG. 6 shows the latches $26_1$, $26_2$ put into place in the ring 20 on either side of the window 21, their end faces $263_1$, $261_2$ associated with the locking lugs $264_1$, $264_2$ facing each other.

The following step of constructing the nozzle consists in engaging the vanes 12 in succession in the ring 20. As shown in section in FIGS. 7 and 8, each vane 12 is engaged by inserting the upstream hooking tab 162 into the window 21 and then titling so as to cause the vane to slide along the ring 20. The shapes of the outer platforms 16 of the vanes 12 and of the ring 20 are arranged so that putting a vane 12 in position causes the frustoconical bearing surfaces 162*b* and 222*b* to press mutually against each other, and also causes the frustoconical bearing surfaces 164*b* and 242*b* to press mutually against each other, while the stiffener rib 166 comes into abutment against the rib 26 of the ring 20 (FIG. 1). The frustoconical bearing surfaces 222*b* and 242*b* of the ring 20 contribute to holding the vane 12 radially and axially. The rib 166 and the web of the ring 20 advantageously present substantially plane contact surfaces, with the radial bearing of the rib 166 against the web 26 opposing tilting of the vane 12.

Figure 9:
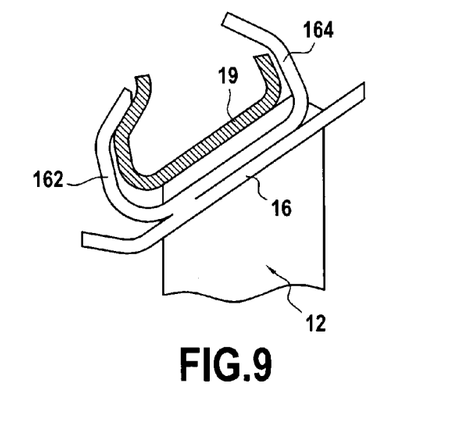

In order to assemble the last vane 12 in the insertion window 21, this vane is provided with a capsule 19 for reconstructing the ring 20 in the portion corresponding to the window 21 (FIG. 9). The capsule 19 is made of metal material, preferably material identical to that of the ring 20.

Figure 10:
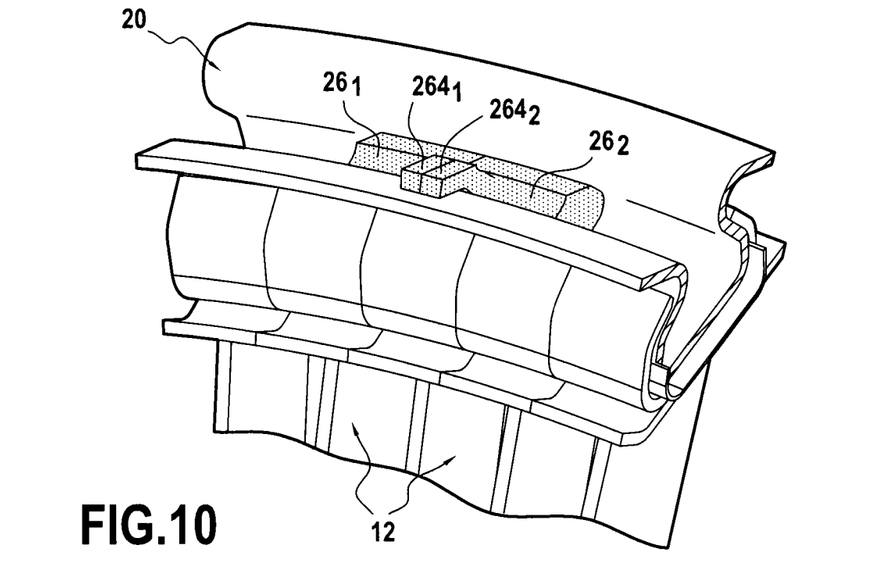
Figure 11:
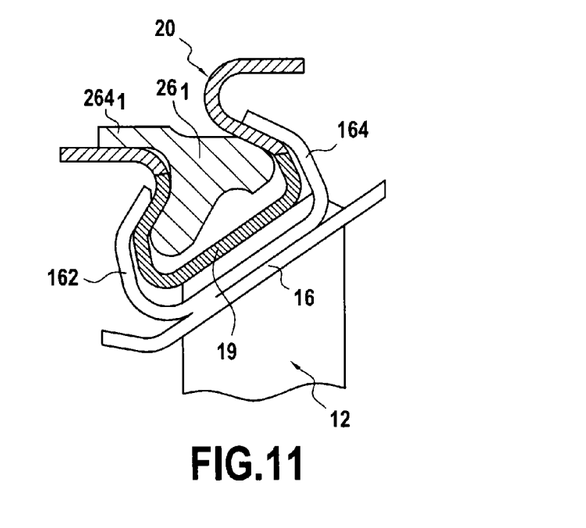

After the last vane has been put into place, the latches $26_1$ and $26_2$ are moved towards each other as shown in FIG. 10. The locking lugs $264_1$, $264_2$ are then close to each other at the window 21, thereby preventing the latches from tilting, such that the last vane is blocked in its position, as shown in section in FIG. 11.

The nozzle as constituted in this way is put into place in the turbine casing by means of the hooks 224, 244 in a manner similar to a conventional metal nozzle.

The function of the ring 20 is not only to enable the vanes 12 to be mounted and assembled together but also to limit outward leakage from the passage 50 in the nozzle, with no particular sealing means being provided in this example between the touching outer platforms of adjacent vanes 12.

Upstream from the nozzle 10, the sectors of the ring 42 supporting the abradable material 41 may be held by overhangs 168 formed at the upstream ends of the outer platforms 16 of the vanes 12. Nevertheless, it is preferable for the sectors of the ring 42 to be held by an annular ring 60 (FIG. 1), e.g. made in the form of sheet metal. The ring 60 may be made of a metal that is similar or identical to that of the ring 20.

The ring 60 is preferably in the form of a complete annulus. In the example shown, it presents a portion 62 of channel-section for attaching to the turbine casing. The portion 62 is extended inwards by a portion 64 of substantially C-shaped channel section forming a hook for holding the sectors of the ring 42, it being understood that both of the portions 62 and 64 are open upstream.

On its downstream side, the ring 60 bears axially against the upstream faces of the upstream attachment tabs 162 of the vanes 12 via the web of the channel-section portion 62 and/or via the portion 64. The overhangs 168 can hold the portion 64 radially by bearing thereon.

In addition to supporting the sectors of the ring 42, the ring 60 contributes to improving sealing on the outside of the passage 50.

Figure 12:
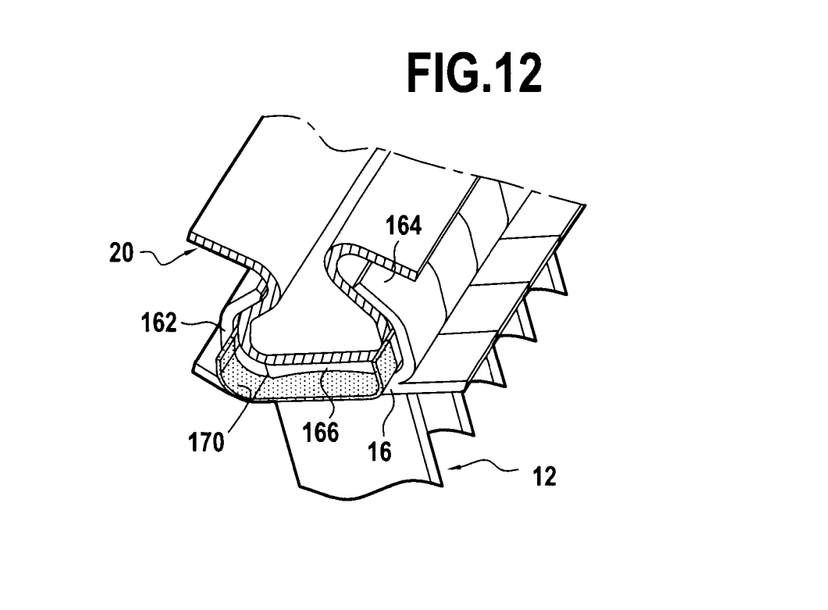
FIG. 12 is a fragmentary view in perspective and partially cut away showing a variant embodiment of a turbine nozzle of the invention.

An additional improvement in sealing can be achieved by placing sealing wafers 170 on the outside faces of the outer platforms 16 of the vanes 12, as shown in FIG. 12. By way of example, the wafers 170 are in the form of pieces of metal sheet of channel-section with flanges bearing against the inside portions of the attachment tabs 162, 164. The wafers 170 are made of a metal material similar and preferably identical to that of the ring 20. Each wafer covers the junction between two outer platforms 16, e.g. extending between the stiffener ribs 166 of two adjacent vanes. The wafers 170 are put into place progressively as the vanes 12 are being assembled.

It should be observed that the facts of making the ring 20 out of metal sheet so that it has a certain capacity for deformation, and of the mutual bearing between the ring 20 and the vanes 12 taking place via surfaces that are frustoconical make it possible to accommodate differential expansion between the CMC material of the vanes 12 and the metal material of the ring 20, particularly since the bearing surfaces are situated on the outside of the platforms 16, and are thus not directly exposed to the stream flowing in the passage 50.

The description above relates to making a turbine nozzle using single-airfoil vanes. Naturally, the invention can also be implemented with vanes having more than one airfoil extending between a single inner platform and a single outer platform, e.g. vanes having two airfoils or three airfoils.

In addition, it is possible to envisage making the assembly ring 20 out of a plurality of sectors, e.g. two, three, or four sectors, each sector covering a plurality of adjacent vanes. It is then possible to simplify assembling vanes in the ring sectors since there is no need for an insertion window, a closure capsule, or locking latches, with the complete nozzle being assembled on being mounted in the turbine casing. Sealing wafers are then advantageously arranged between adjacent metal ring sectors. In similar manner, the ring 60, if any, may also be made using a plurality of sectors.

Although the description relates to a ring having a section that is substantially a-shaped, other shapes could be envisaged, providing the ring presents frustoconical portions enabling the vanes to be held radially and axially and portions enabling the ring to be attached to the turbine casing.

The above detailed description relates to a turbine engine stator wheel forming a turbine nozzle. The invention is equally applicable to a turbine engine stator wheel forming a compressor diffuser. The compressor diffuser then comprises a plurality of vanes, each having an inner platform, an outer platform presenting attachment tabs on the outside, and at least one airfoil extending between the inner and outer platforms, the vane with the outer platform and the attachment tabs forming a single piece of composite material. The compressor diffuser vanes are assembled together and supported by means of a metal assembly ring that extends continuously along the outer platforms of a plurality of adjacent vanes and that forms a distinct assembly part between the vanes and a compressor casing, the vanes being assembled together by means of a metal ring in the manner described above for a stator wheel forming a turbine nozzle.

In the upstream stage(s) of the compressor where the temperatures encountered in service are the lowest in the compressor, the composite material of the compressor diffuser vanes may be an organic matrix composite (OMC) material having reinforcing fibers, e.g. carbon, glass, aramid, or ceramic fibers densified by a polymer matrix, e.g. an epoxy, bismaleimide, or polyimide matrix. In the downstream stage(s) of the compressor, the composite material of the compressor diffuser vanes may be a CMC material.

The invention claimed is:

1. A turbine engine stator wheel, comprising:
    a plurality of vanes each comprising an inner platform, an outer platform presenting attachment tabs on the outside, and at least one airfoil extending between the inner and outer platforms, the vane and the outer platform together with the attachment tab forming a single piece of ceramic matrix composite material or of organic matrix composite material; and
    a metal assembly ring in which the attachment tabs of the vanes are engaged, the metal ring supporting all of the vanes, extending continuously along the outer platforms of a plurality of adjacent vanes, and forming a distinct assembly part between the vanes and a casing.

2. The stator wheel according to claim 1, wherein the metal ring is made of sheet metal.

3. The stator wheel according to claim 1, wherein the metal ring presents frustoconical bearing surfaces contributing to holding the vanes radially and axially.

4. The stator wheel according to claim 1, wherein the metal ring has a section that is substantially Ω-shaped and outwardly open, having a web portion and flanges terminating in end portions forming hooks for attaching to a casing, and frustoconical bearing surfaces in contact with the attachment tabs of the vanes are situated on the outside faces of the flanges of the ring.

5. The stator wheel according to claim 1, wherein the outer platform of each vane presents a rib projecting outwards and coming into radial abutment against a surface portion of the metal ring.

6. The stator wheel according to claim 1, wherein the metal ring comprises a single piece and presents a vane insertion window.

7. The stator wheel according to claim 6, further comprising at least one latch for blocking in position a vane mounted at the level of the insertion window.

8. The stator wheel according to claim 1, wherein sealing wafers are arranged on the outer faces of the outer platforms of the vanes, each wafer covering at least part of a junction between the outer platforms of two adjacent vanes.

9. A turbine engine turbine, comprising:
    the stator wheel according to claim 1 forming a turbine nozzle,
    wherein the composite material is a ceramic matrix composite material, the turbine having a rotor wheel adjacent to the nozzle and comprising blades provided at their ends with wipers facing an abradable material supported by a ring, an additional metal ring being mounted between the abradable support ring and the outer platforms of the vanes of the nozzle, bearing thereagainst.

10. A turbine engine compressor, comprising:
    the stator wheel according to claim 1 forming a compressor diffuser,
    wherein the compressor has a rotor wheel adjacent to the diffuser and comprising blades provided at their ends with wipers facing an abradable material supported by a ring, and an additional metal ring is mounted between the abradable support ring and the outer platforms of the vanes of the diffuser, bearing thereagainst.

11. The stator wheel according to claim 1, wherein the vane and the outer platform together with the attachment tab form a single piece of ceramic matrix composite material.

12. The stator wheel according to claim 11, wherein said metal ring has bearing surfaces in contact with said ceramic matrix material of said attachment tab.

13. The stator wheel according to claim 12, wherein the vane and the outer platform together with the attachment tab are free of any metal.

14. The stator wheel according to claim 1, wherein the vane and the outer platform together with the attachment tab form a single piece of organic matrix composite material.

15. The stator wheel according to claim 14, wherein said metal ring has bearing surfaces in contact with said organic matrix composite material of said attachment tab.

16. The stator wheel according to claim 15, wherein the vane and the outer platform together with the attachment tab are free of any metal.

* * * * *